(12) United States Patent
Nguyen

(10) Patent No.: US 9,065,721 B2
(45) Date of Patent: Jun. 23, 2015

(54) DYNAMIC NETWORK LOAD REBALANCING

(71) Applicant: DELL PRODUCTS L.P., Round Rock, TX (US)

(72) Inventor: Cuong Nguyen, Westminster, CA (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 13/831,615

(22) Filed: Mar. 15, 2013

(65) Prior Publication Data
US 2014/0269305 A1    Sep. 18, 2014

(51) Int. Cl.
H04L 12/70    (2013.01)
(52) U.S. Cl.
CPC .................................... H04L 47/00 (2013.01)
(58) Field of Classification Search
CPC .................................................. H04L 41/0668
USPC .................. 370/229, 235, 236, 237
See application file for complete search history.

(56) References Cited

U.S. PATENT DOCUMENTS

2012/0287791 A1*  11/2012  Xi et al. .................... 370/237
2013/0182574 A1*   7/2013  So et al. .................... 370/236

OTHER PUBLICATIONS

Sohn et al., "Congestion-triggered Multipath Routing based on Shortest Path Information," Oct. 11, 2006, IEEE.*

* cited by examiner

Primary Examiner — Jae Y Lee
(74) Attorney, Agent, or Firm — Haynes and Boone, LLP

(57) ABSTRACT

A network device includes a communication interface. A processing system is coupled to the communication interface. A memory system is coupled to the processing system and includes instructions that, when executed by the processing system, cause the processing system to receive first traffic though the communication interface and forward the first traffic downstream though the communication interface using a first path. The memory system also includes instructions that, when executed by the processing system, cause the processing system receive a congestion notification from a downstream network device through the communication interface and determine whether the congestion notification is associated with the first traffic. In response to the first traffic being associated with the congestion notification, the processor determines whether a second path exists for forwarding subsequent traffic that is associated with the congestion notification downstream though the communication interface.

20 Claims, 9 Drawing Sheets

DYNAMIC NETWORK LOAD REBALANCING

BACKGROUND

The present disclosure relates generally to information handling systems, and more particularly to dynamically rebalancing the traffic load across a network of information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be networked together using, for example, router IHSs that may route traffic between client IHSs and server IHSs. Existing routing protocols are used by router IHSs to calculate routes for network traffic based on local knowledge and determine the optimal paths for the traffic using static weights for the links to other router IHSs. However, such static routing of traffic may result in under-utilized links in the network. Equal Cost Multi-Path (ECMP) routing attempts to solve this problem by load balancing available links. However, ECMP routing operates independently on each router IHS with no knowledge of the global network state and, as a result, may not be able to provide globally optimized paths in the network.

Various conventional approaches attempt to remedy these problems by detecting link loads and modifying the weights on congested links. However, this leads to undesirable situations where frequent changes to link weights, or link weight modifications on too many links in the network, cause the link weights to differ greatly from initial administrative settings and result in unpredictable routing issues including routing loops. Other conventional approaches include centralized management solutions that attempt to monitor the link loads across the entire network and reroute traffic around congested links, but such solutions are quite complex and tend to be slow to react to congestion scenarios.

Accordingly, it would be desirable to provide an improved network load rebalancing system.

SUMMARY

According to one embodiment, a network device includes a communication interface; a processing system that is coupled to the communication interface; a memory system that is coupled to the processing system and includes instructions that, when executed by the processing system, cause the processing system to: receive first traffic though the communication interface; forward the first traffic downstream though the communication interface using a first path; receive a congestion notification from a downstream network device through the communication interface; and determine whether the congestion notification is associated with the first traffic and, in response to the first traffic being associated with the congestion notification, determine whether a second path exists for forwarding subsequent traffic that is associated with the congestion notification downstream though the communication interface.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
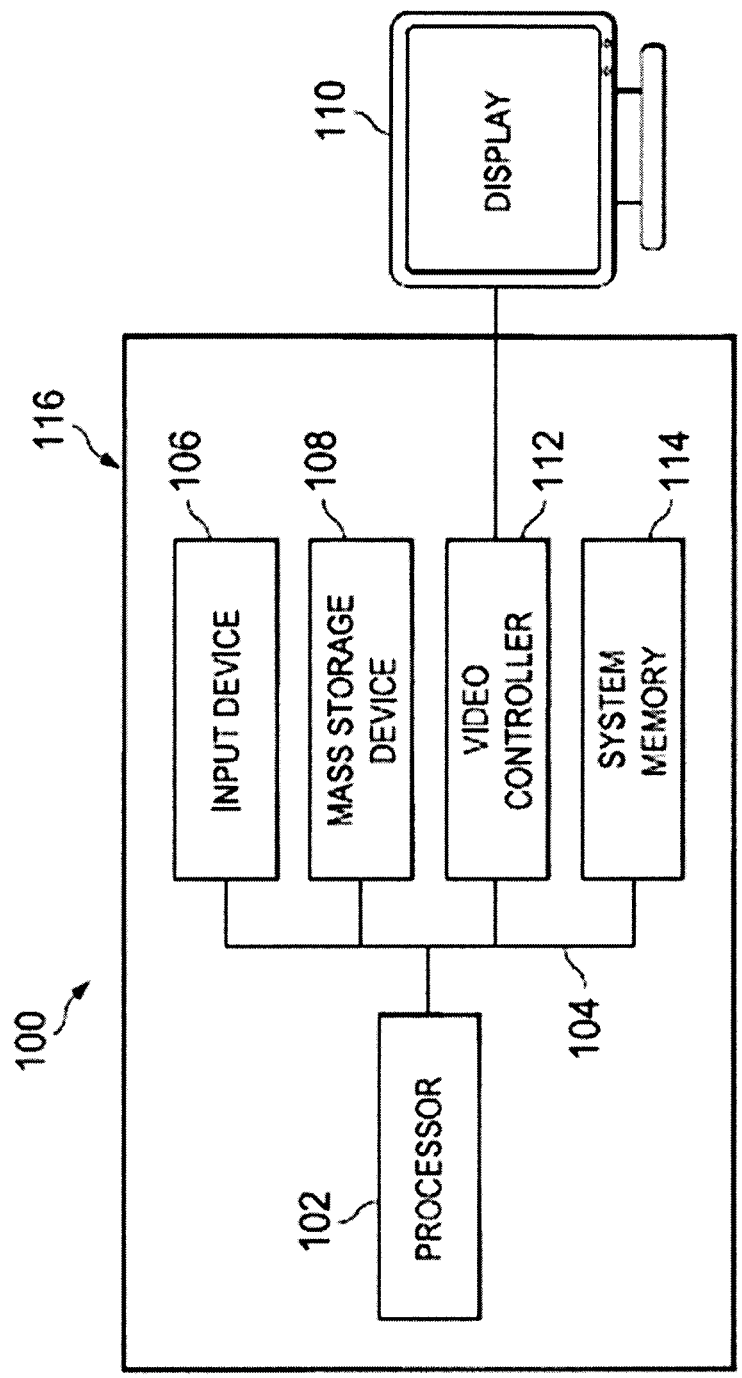
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
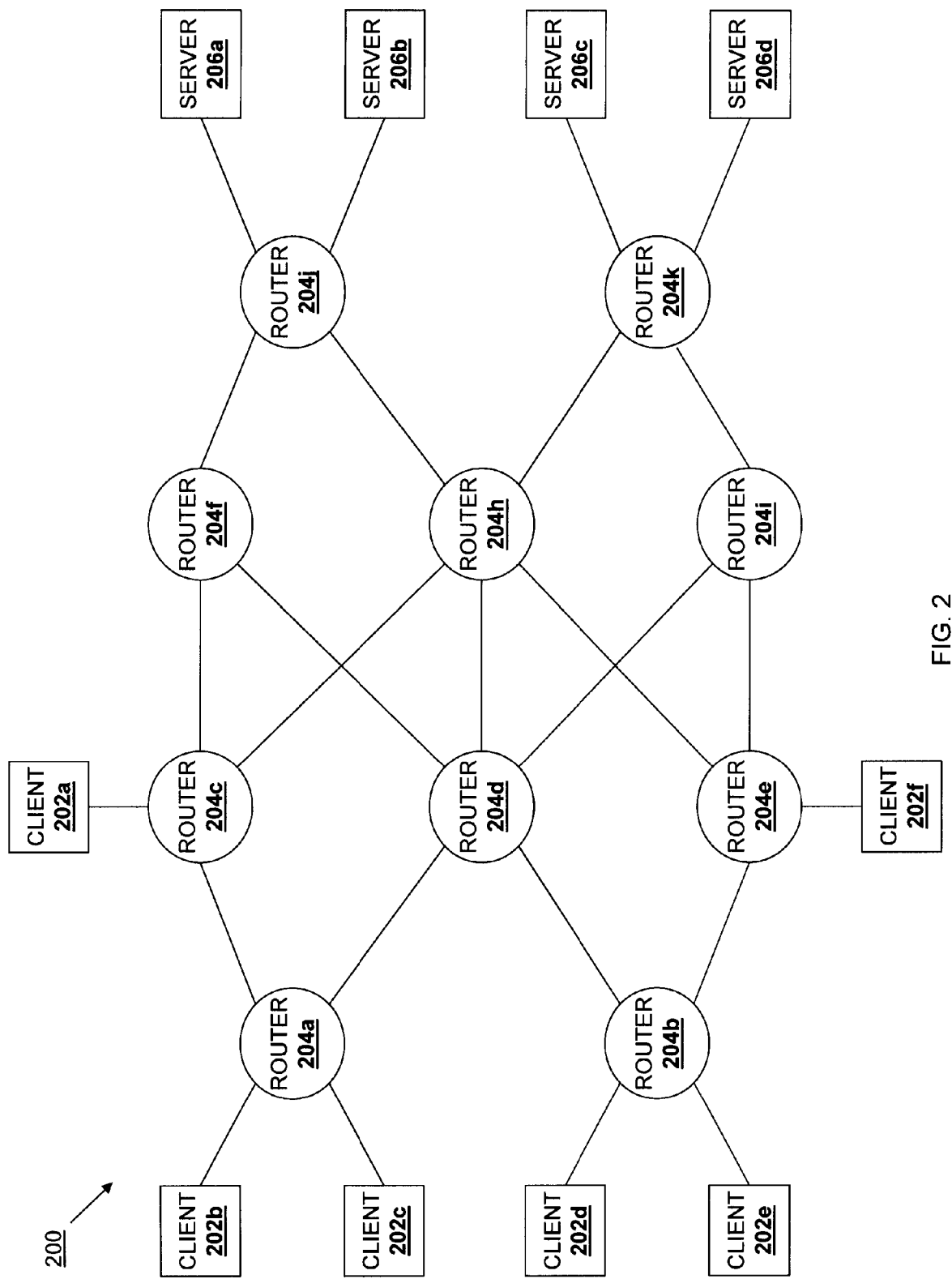
FIG. 2 is a schematic view illustrating an embodiment of a networked system.

Referring now to FIG. 2, an embodiment of a networked system 200 is illustrated. The networked system 200 includes a plurality of IHSs, each of which may include some or all of the IHS components of the IHS 100 discussed above with reference to FIG. 1, that are networked together using methods known in the art. In the illustrated embodiment, a plurality of client IHSs 202a, 202b, 202c, 202d, and 202e are networked through a plurality of router IHSs 204a, 204b, 204c, 204d, 204e, 204f, 204g, 204h, 204i, 204j, and 204k for communication with a plurality of server IHSs 206a, 206b, 206c, and 206d. In the example provided, the client IHS 202a is connected to the router IHS 204c, the client IHS 202b and the client IHS 202c are each connected to the router IHS 204a, the client IHS 202d and the client IHS 202e are each connected to the router IHS 204b, and the client IHS 204e is connected to the router IHS 204e. Furthermore, in the example provided, the server IHS 206a and the server IHS 206b are each connected to the router IHS 204j, and the server IHS 206c and the server IHS 206d are each connected to the router 204k.

Each of the router IHSs 204a-k are connected to each other as illustrated in FIG. 2 by links (illustrated as lines between the router IHSs) that are referenced herein as link(xy), where x is the letter portion of the reference number of the first router IHS to which the link is connected, and y is the letter portion of the reference number of the second router IHS to which the link is connected. Thus, in the example provided, a link(ac) connects router IHS 204a to router IHS 204c, a link(ad) connects router IHS 204a to router IHS 204d, a link(bd) connects router IHS 204b to router IHS 204d, a link(be) connects router IHS 204b to router IHS 204e, a link (cf) connects router IHS 204c to router IHS 204f, a link(ch) connects router IHS 204c to router IHS 204h, a link(df) connects router IHS 204d to router IHS 204f, a link(dh) connects router IHS 204d to router IHS 204h, a link(di) connects router IHS 204d to router IHS 204i, a link(eh) connects router IHS 204e to router IHS 204h, a link(ei) connects router IHS 204e to router IHS 204i, a link(fj) connects router IHS 204f to router IHS 204j, a link(hj) connects router IHS 204h to router IHS 204j, a link(hk) connects router IHS 204h to router IHS 204k, and a link(ik) connects router IHS 204i to router IHS 204k. While a specific example of the networked system 200 including client IHSs 202a-f, router IHSs 204a-k, and server IHSs 206a-d has been provided, one of skill in the art will recognize that a variety of other network devices such as storage devices, end-system hosts, other network infrastructure devices supporting ECMP, and a variety of other client networkable devices may be included in the network system 200, and a variety of different configurations of the networked system 200 may be provided, without departing from the scope of the present disclosure.

Figure 3:
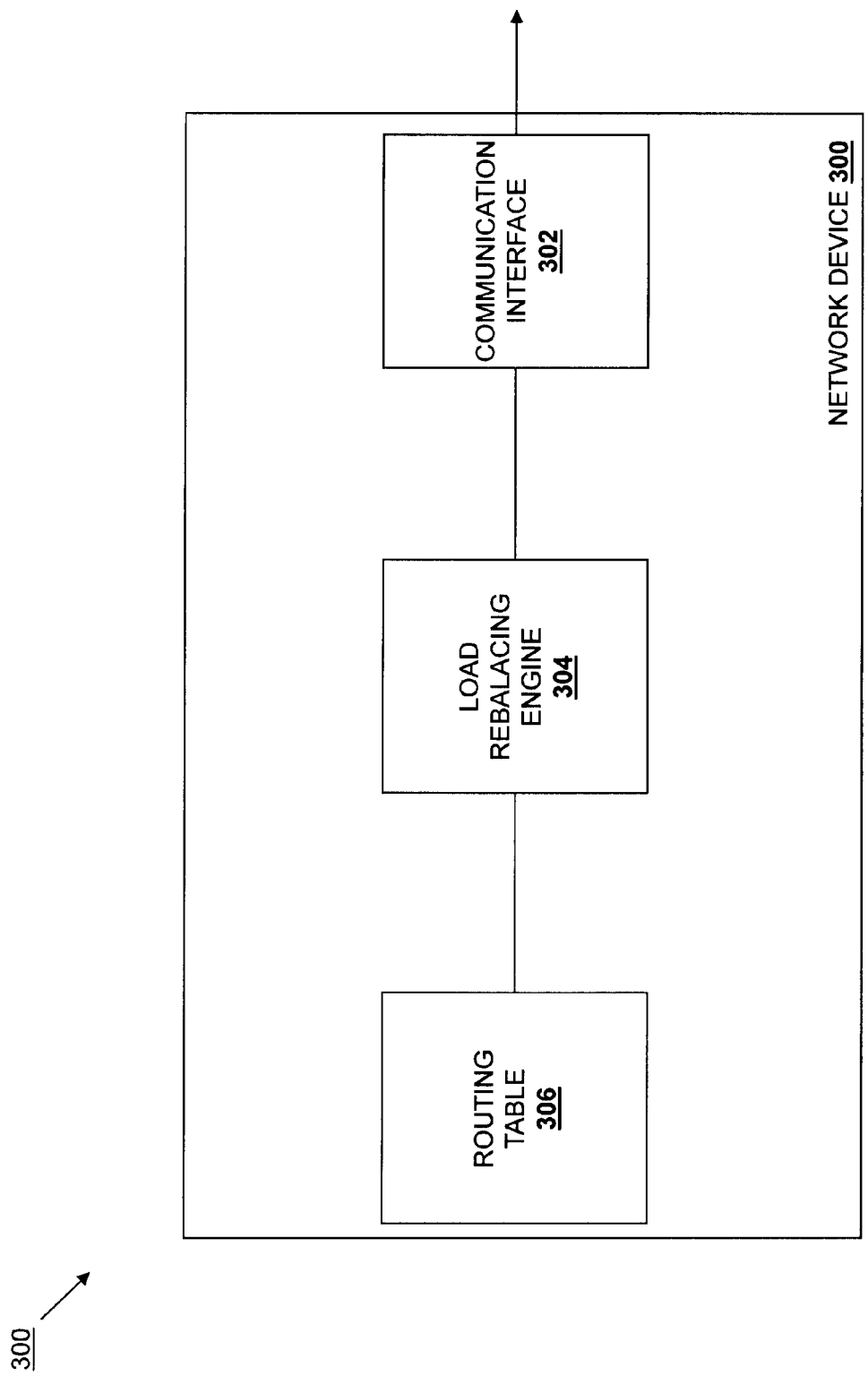
FIG. 3 is a schematic view illustrating an embodiment of a network device.

Referring now to FIG. 3, an embodiment of a network device 300 is illustrated. In an embodiment, the network device 300 may include some or all of the components of the IHS 100 discussed above with reference to FIG. 1. In the examples below, any or all of the router IHSs 204a-k in the networked system 200 may be the network device 300 and/or include the components of the network device 300. However, as discussed above, a networked system may vary from the networked system 200 illustrated in FIG. 2 and may include other devices than those illustrated in FIG. 2 without departing from the scope of the present disclosure. As such, the network device 300 may be provided as a variety of other network devices such as, for example, client IHSs, router IHSs, server IHSs, storage devices, devices that carry traffic over a core network, etc., and may be included in a networked system that operates according to the teachings discussed herein without departing from the scope of the present disclosure. The network device 300 includes a communication interface 302. In an embodiment the communication interface 302 may include ingress ports, egress ports, other physical Ethernet network interfaces, and/or a variety of other communication interface components known in the art.

In an embodiment, the network device 300 includes a processing system (e.g., the processor 102 discussed above with reference to FIG. 1) and a memory system (e.g., the system memory 114 and/or the storage device 108 discussed above with reference to FIG. 1) that include instructions that, when executed by the processing system, cause the processing system to provide a load rebalancing engine 304 that is coupled to the communication interface 302 and that is operable to perform the functions of the router IHSs 204a-k, the network device 300, and/or other network devices as discussed with reference to the methods below. Furthermore, the memory system may include a routing table 306 that is coupled to the load rebalancing engine 304 and that stores information related to links and/or paths from the network device 300 and through the networked system 200, discussed in further detail below.

Embodiments of methods for rebalancing a network load will now be described with reference to the networked system 200 discussed above with reference to FIG. 2. The methods provide for the dynamic rebalancing of a network load based on considerations of the global network state without the need for a centralized management system and/or the modification of link weights. Conventional network load balancing is typically based upon one of a plurality of equal cost multi-path (ECMP) routing techniques. One example of ECMP routing is ECMP per-packet load balancing in which, for a given packet flow, packets are distributed across all available links to their destination host. ECMP per-packet load balancing provides for relatively good load balancing across a networked system, but is not a practical solution for the majority of networked systems as it requires that each packet be inspected and may cause packet reordering as different packets for the same packet flow travel through different paths in the networked system to arrive at a destination host. Another example of ECMP routing is ECMP per-destination-host load balancing in which, for a given destination-host (e.g., as determined by a destination host Internet Protocol (IP) address), a network device will add a routing entry that specifies the link connected to that network device that will be used for all packets destined for that destination-host. ECMP per-destination-host load balancing does not require much use of the processing system in a network device (as it simply adds a routing entry per destination-host to its routing table), but can result in under-utilized links when a majority of traffic is destined for a specific destination host (and thus will be sent over the same link), and is not practical at core network routers that may include tens, hundreds, or even thousands of destination hosts. Yet another example of ECMP routing is ECMP per-destination-network load balancing in which, for a given destination-network, a network device will add a routing entry to its routing table that specifies the link connected of that network device that will be used for all packets destined for that destination-network. ECMP per-destination-network load balancing is more efficient than ECMP per-destination-host load balancing, especially for core routers. However, ECMP per-destination-network load balancing is even more likely to result in under-utilized links than ECMP per-destination-host load balancing, as all traffic toward a given destination-network will occupy the same link, so when a majority of traffic is destined for a single host in that destination-network, other hosts is the same destination-network may suffer even when an alternate path through the networked system exists.

As discussed in detail below, embodiments of the systems and methods of the present disclosure provide for a combination of ECMP per-destination-network load balancing and ECMP per-destination-host load balancing, which has been found to provide a variety of load balancing benefits in a variety of situations including, for example, when a relatively small number of destination-hosts receive a relatively large amount of the traffic through the networked system. In the embodiment discussed below, ECMP per-destination-network load balancing is used by router IHSs in the networked system until traffic that is associated a destination-host and received at a network device is determined to be excessive, at which time that network device may send a congestion notification upstream to attempt to have upstream router IHSs create an alternate path for that destination-host. Thus, router IHSs in the networked system 200 may load balance the network traffic based on a first attribute of that traffic (e.g., its destination-network) but may switch to load balancing the network traffic based on a second attribute of that traffic (e.g., its destination-host) when a congestion notification is received and some condition are satisfied.

Referring to the networked system 200 of FIG. 2, in the embodiment discussed below according to the methods 400 and 500, the server IHSs 206a-d provide services used by clients on the client IHSs 202a-f, and each of the router IHSs 204a-k are using ECMP routing configured to initially operate according to ECMP per-destination-network load balancing as discussed above. As can be seen in FIG. 2, router IHSs 204a, 204b, 204c, and 204d each have two equal cost paths to the destination-network that includes server IHSs 206a and 206b, while router IHSs 204e, 204f, and 204h each has only one lowest cost path to the destination-network that includes server IHSs 206a and 206b.

Figure 6:
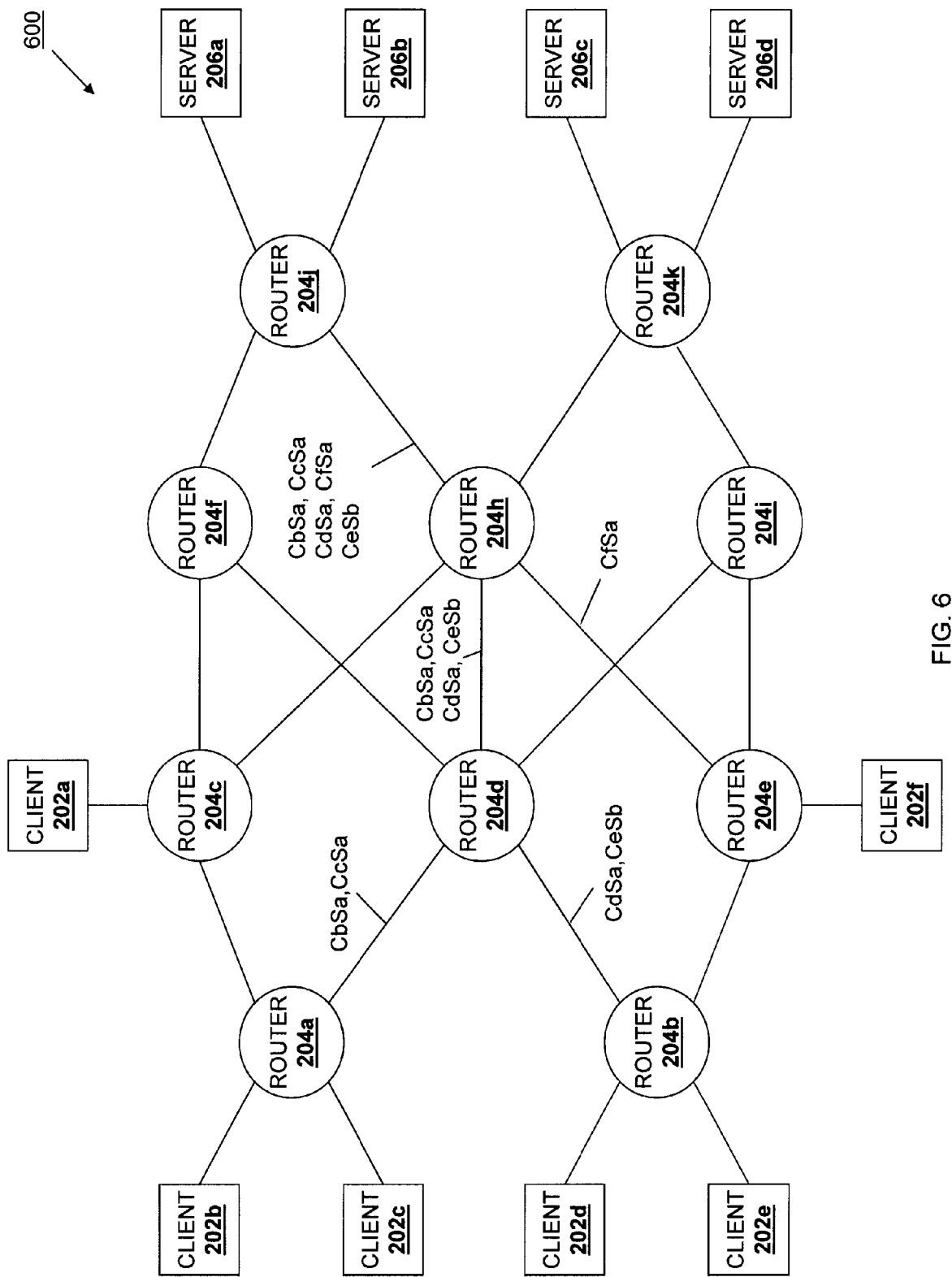
FIG. 6 is a schematic view illustrating an embodiment of the networked system of FIG. 2 in a first traffic situation.

Referring now to FIG. 6, the networked system 200 of FIG. 2 is illustrated experiencing a first traffic situation 600 in which traffic from client IHSs is being sent to server IHSs over some of the router IHSs. Traffic in the examples in FIGS. 6-9 below is restricted to traffic from client IHSs to server IHSs for clarity of discussion, and is designated as CxSy, where x is the letter portion of the reference number of the client IHS sending the traffic, and y is the letter portion of the reference number of the server IHS to which the traffic is being sent (e.g., CaSa is traffic sent from client IHS 202a to server IHS 206a). In the first traffic situation 600 illustrated in FIG. 6, the router IHS 204a has used ECMP per-destination-network load balancing to select link(ad) to the router IHS 204d as a portion of the path through the networked system 200 over which traffic addressed to the destination-network that includes servers IHSs 206a and 206b will be forwarded. Similarly, the router IHS 204b has used EXMP per-destination-network load balancing to select link(bd) to the router IHS 204d as a portion of the path through the networked system 200 over which traffic addressed to the destination-network that includes servers IHSs 206a and 206b will be forwarded. The router IHS 204e is using link(eh) to the router 204h as a portion of the path through the networked system 200 over which traffic to the destination-network that includes servers IHSs 206a and 206b will be forwarded (because that is the only path from router 204e to that destination-network). As can be seen, the use of ECMP per-destination-network load balancing by the router IHSs 204a and 204b has resulted in the traffic CaSa, CbSa, CcSa, CdSa, CfSa, and CeSb in the networked system 200 being sent from router IHS 204h and over link (hj) to router IHS 204j in order to reach the destination-network that includes the server IHSs 206a and 206b. Thus, in the first traffic situation 600, the router 204h may receive first traffic (e.g., any or all of the traffic) from upstream network devices (e.g., the router IHSs 204a, 204b, 204d, and 204e) through one or more ingress ports (e.g., on the communication interface 302) and forward that first traffic through one or more egress ports (e.g., on the communication interface 302) to the downstream router IHS 204j over a path through the networked system 200 that includes the link(hj).

Figure 4:
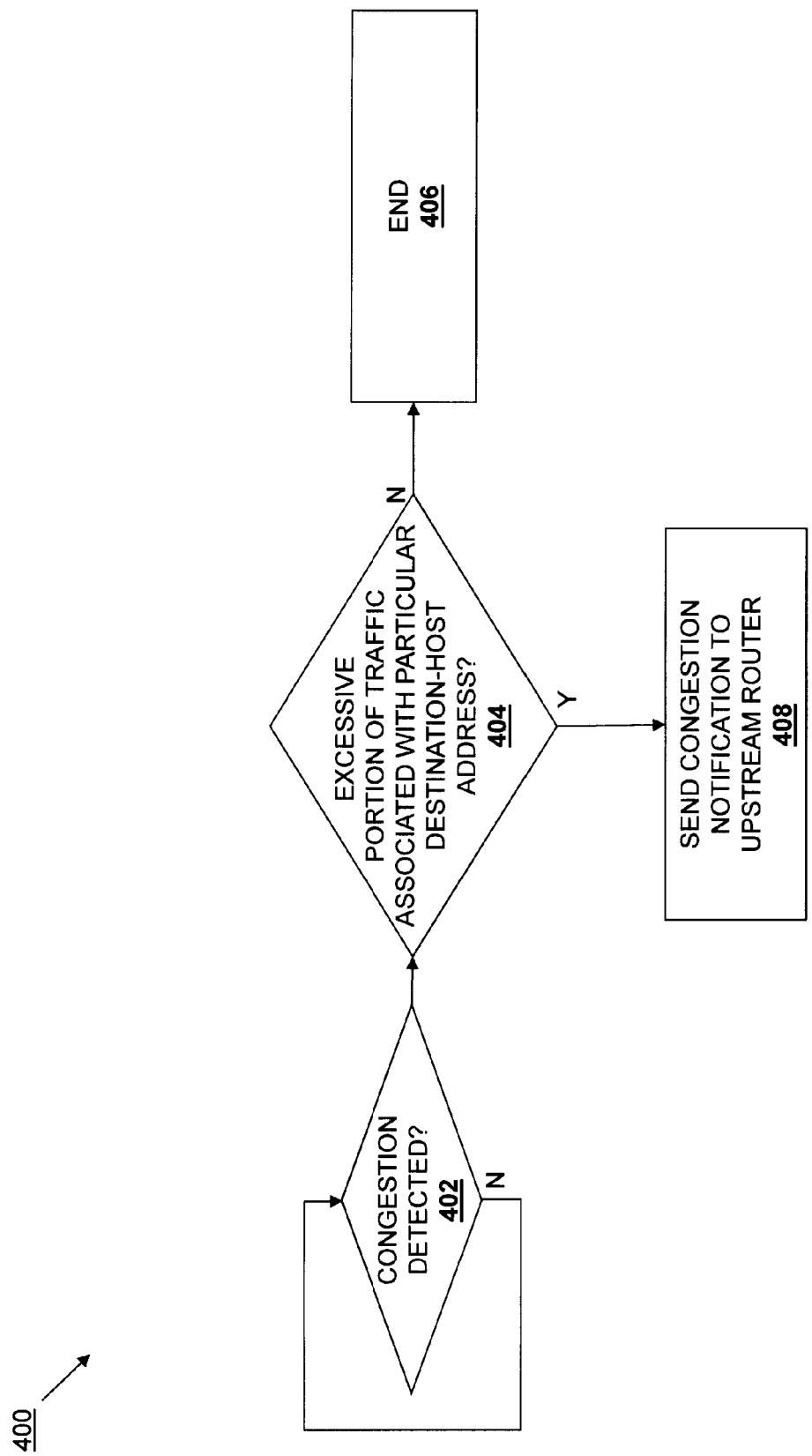
FIG. 4 is a flow chart illustrating an embodiment of a method for sending a congestion notification.

Referring now to FIGS. 4 and 6, an embodiment of a method 400 for rebalancing a network load is illustrated. In the discussion below, the method 400 is performed by the router IHS 204j that is receiving an excessive traffic load from router IHS 204h on link(hj). However, the method 400 may be performed by any network device in the networked system 200 when excessive traffic is received over a link or links to that network device. The method 400 begins at decision block 402 where it is determined whether congestion has been detected. In an embodiment, the router IHS 204j monitors one or more ingress ports (e.g., on the communication interface 302) to determine whether there is congestion on that router IHS 204j. For example, the router 204j may monitor traffic received through the communication interface 302 from one or more upstream network devices and determine whether that traffic exceeds a threshold amount that may be based on a bandwidth of the router 204j, the router 204j may monitor the latency (e.g., the end-to-end latency across the link(hj)) and determine whether that traffic exceeds a threshold amount, and/or the router 204j may use a variety of other congestion details known in the art to determine whether traffic exceeds a threshold amount. If no congestion is detected at decision block 402, the method 400 returns to decision block 402 to continuing monitoring for congestion. Thus, each network device in the networked system 200 may continuously monitor for congestion according to the method 400.

If congestion is detected at decision block 402, the method 400 then proceeds to decision block 404 where it is determined whether an excessive portion of the traffic causing the congestion is associated with a particular destination-host address. In an embodiment, the router IHS 204j monitors the packets of the traffic received at the one or more ingress ports on the router IHS 204j to determine if a subset of the packets in that traffic include the same destination-host address and that subset of packets are requiring a bandwidth of the router IHS 204j that is greater than a predetermined bandwidth. However, a portion of traffic associated with a particular destination-host address may be determined to be excessive at block 404 if, for example, that portion of the traffic is more than a predetermined percentage of the traffic received at the router IHS 204j, the latency over the link(hj) exceeds a predetermined amount, and/or exhibits a variety of other excessive traffic characteristics known in the art. For example, the router IHS 204j may include a maximum transmission bandwidth, and at decision block 404 the router IHS 204*j* may determine that it is transmitting traffic at its maximum transmission bandwidth, a portion of that traffic is associated with a particular destination-host address, and that portion of the traffic is using more than a predetermined amount of that maximum transmission bandwidth. If, at decision block 404, it is determined that there is no excessive portion of the traffic that is associated with a particular destination-host address, the method 400 proceeds to block 406 where the method 400 ends.

If, at decision block 404, it is determined that an excessive portion of the traffic is associated with a particular destination-host address, the method 400 proceeds to block 408 where a congestion notification is sent to an upstream router. In the illustrated embodiment, the router IHS 204*j* may determine that packets in the traffic received at the one or more ingress ports on the router IHS 204*j* include a destination-host address for the server IHS 206*a* (e.g., an IP address for the server IHS 206*a*), and the transmittal of those packets to the server IHS 206*a* requires a bandwidth of the router IHS 204*j* that is greater than a predetermined bandwidth. In response, at block 408 of the method 400, the router IHS 204*j* will then send a congestion notification upstream over the link(fj) to the router IHS 204*f* and over the link(hj) to the router IHS 204*h*. In an embodiment, the congestion notification sent at block 408 may include an identifier of the destination-host (e.g., an IP address of the server IHS 206*a*) for which an excessive portion of the traffic is being received, a request to use an alternate path for the traffic associated with the destination-host for which an excessive portion of the traffic is being received, a reason why the request to use an alternate path for traffic associated with the destination-host is being requested (e.g., bandwidth considerations, latency considerations, etc.), and/or a variety of other congestion information known in the art.

While the method 400 has been described above as being performed by an edge router (e.g., the router IHS 204*j*) that receives traffic from a core router (e.g., the router IHS 204*h*) that causes congestion and includes traffic associated with a destination-host (e.g., the server IHS 206*a*) that is using a predetermined portion of the bandwidth of the edge router, resulting in a congestion notification being sent from the edge router to the core router, one of skill in the art will recognize that the method 400 may be performed by a variety of other network devices in a networked system in order to allow for a non-centralized detection and upstream reporting mechanism to load balance the traffic in the networked system. Thus, with reference to the illustrated embodiment, it should be understood that the method 400 may be performed in the networked system 200 by other devices (e.g., routers other than the router IHS 204*j*) without departing from the scope of the present disclosure.

Figure 5:
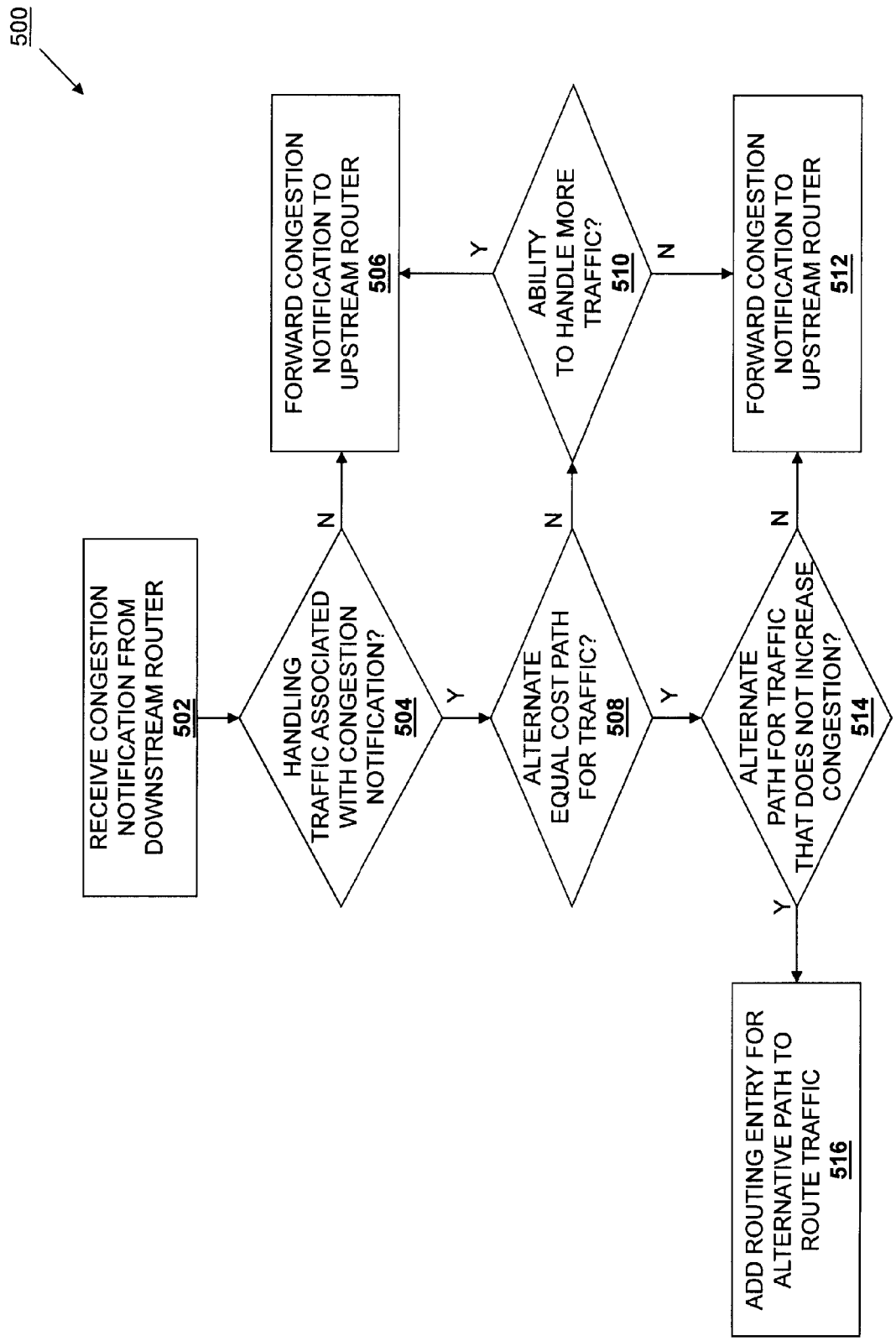
FIG. 5 is a flow chart illustrating an embodiment of a method for rebalancing a network load.

Referring now to FIG. 5, an embodiment of a method 500 for rebalancing a network load is illustrated. In the discussion below, the method 500 may be performed by any router IHSs in the networked system 200 that receives a congestion notification, either directly from the router IHS 204*j* or from another router IHS that is propagating the congestion notification through the networked system 200. The method 500 begins at decision block 502 where a congestion notification is received from a downstream router. As discussed above, with reference to the method 400, network devices in the networked system 200 may detect congestion and, if an excessive portion of the traffic causing that congestion is associated with the same destination host, that network device will send a congestion notification upstream links to its upstream network devices. Using the example discussed above, at block 502, each of the router IHS 204*f* and the router IHS 204*h* may receive a congestion notification sent upstream over the link(fj) and the link(hj), respectively, from the router IHS 204*j* when the router IHS 204*j* detects congestion in response to the first traffic situation 600 of FIG. 6.

The method 500 then proceeds to decision block 504 where the network device receiving the congestion notification determines whether it is handling traffic associated with the congestion notification. Using the example provided above, each of the router IHS 204*f* and the router IHS 204*h* may review the traffic being sent over the link(fj) and the link(hj), respectively, to the router IHS 204*j* and determine whether packets in that traffic are associated with the destination-host (e.g., those packets include the IP address for the server IHS 206*a*) identified in the congestion notification received at block 502. Thus, in this example, the router IHS 204*f* will determine at decision block 504 that it is not handling traffic associated with the congestion notification, and the method 500 will proceed to block 506 where the router IHS 204*f* may forward the congestion notification upstream (e.g., to router IHSs 204*c* and 204*d*). In some embodiments, the forwarded congestion notification at block 506 may include an indication that the router IHS 204*f* has bandwidth to handle additional traffic. In some embodiments, rather than forwarding the congestion notification upstream at block 506, the method 500 may end at block 506 (i.e., as an optimization, it may preferable not to forward the congestion notification at block 506, but rather only forward congestion notifications at block 512 by routers that are handling traffic associated with the congestion notification.) However, also in this example, the router IHS 204*h* will determine at decision block 504 that it is handling traffic associated with the congestion notification (e.g., traffic CbSa, CcSa, CdSa, CaSa, and CfSa, all destined for server IHS 206*a*), and the method 500 will proceed to decision block 508 where it will be determined whether an alternate equal cost path for the traffic associated with the congestion notification exists.

As discussed above and as can be seen in the first traffic situation 600 in FIG. 6, the router 204*h* only has link(hj) available to forward traffic to the destination-network that includes server IHS 206*a* and server IHS 206*b*. Thus, in this example, at decision block 506 the router 204*h* will determine that there are no alternate equal cost paths for the traffic associated with the congestion notification, and the method 500 will proceed to decision block 510 where it will be determined whether that network device has the ability to handle more traffic associated with the congestion notification. For example, at decision block 510, the router IHS 204*h* may compare current bandwidth being used to handle the traffic through the router 204*h* with a maximum known bandwidth of the router 204*h* to determine whether the router 204*h* can handle more of the traffic (e.g., forward subsequent traffic without delays associated with limited bandwidth) associated with the congestion notification. However, network devices may use other techniques such as, for example, slowing down upstream devices to help in handling the congestion, and/or using a variety of other methods known in the art to determine their traffic handling ability at decision block 510.

If, at decision block 510, it is determined that there is further ability of the network device to handle traffic associated with the congestion notification, the method 500 proceeds to block 506 where the router IHS 204*h* will forward the congestion notification upstream (e.g., to router IHSs 204*c*, 204*d*, and 204*e*). In some embodiments, the forwarded congestion notification at block 506 may include an indication that the router IHS 204*h* has bandwidth to handle additional traffic. As discussed above, in some embodiments of the method 500, the method 500 may end at block 506. However, if at decision block 510 it is determined that the network device does not has ability to handle more traffic associated with the congestion notification, the method 500 proceeds to block 512 where the router IHS 204h will forward the congestion notification upstream (e.g., to router IHSs 204c, 204d, and 204e). In some embodiments, the forwarded congestion notification at block 506 may include an indication that the router IHS 204h does not have any additional bandwidth to handle additional traffic. Thus, in this example, following blocks 506 or 512, each of the router IHSs 204c, 204d, and 204e may begin the method 500 at block 502 where they receive the congestion notification forwarded to them by the router IHSs 204f and/or 204h.

If, at decision block 508, it is determined that a network device has an alternate equal cost path for the traffic associated with congestion notification, the method 500 proceeds to decision block 514 where it is determined whether the alternate path or paths will not increase congestion in the networked system. In an embodiment, the network device that has an alternate equal cost path or paths for the traffic associated with the congestion notification may determine whether that path or paths increase congestion in the networked system by determining what it contributes to the next hop. For example, a network device may receive a congestion notification from a first downstream router that causes that network device to move traffic to an alternate link, which may then cause that network device to receive a congestion notification from a second downstream router. In some embodiments, that network device may move the traffic back to the initial link, but may also be prevented from moving traffic back and forth between the same two links more than a predetermined number of times or within a predetermined time period. If, at decision block 514, it is determined that the alternate path or paths will increase congestion in the networked system, the method 500 proceeds to block 512 where the congestion notification is forwarded upstream to another network device. For example, the router IHS 204d in the first traffic situation 600 of FIG. 6 is using link(dh) to send traffic to router IHS 204h, but at decision block 512 will determine that it has an alternate equal cost path through the networked system 200 to the destination-network that includes server IHSs 206a and 206b over link(df) to router 204f. However, at decision block 514 the router IHS 204d may determine that use of link(df) (e.g., the alternate equal cost path) will increase congestion in the networked system 200 and, in response, forward the congestion notification upstream to the router IHSs 204a and 204b over link(ad) and link(bd), respectively, without modifying its routing table to redirect traffic associated with the congestion notification.

If, at decision block 514, it is determined that an alternate path does not increase congestion in the networked system, the method 500 will proceed to decision block 516 where a routing entry is added to the network device that includes the alternate equal cost path that does not increase congestion in the networked system in order to reroute the traffic associated with the congestion notification. For example, the router 204d may determine that use of link(df) (e.g., the alternate equal cost path) will not increase congestion in the networked system 200 and, in response, add a routing entry into its routing table (e.g., the routing table 306) for the traffic associated with the congestion notification such that subsequent traffic associated with the congestion notification will be forwarded over link(df) instead of link(dh). In an embodiment, adding the routing entry at block 516 results in the network device providing a specific route for traffic associated with the destination host provided in that routing entry, and thus that network device switches from per-destination network load balancing to per-destination-host load balancing for that traffic. As such, subsequent traffic associated with the congestion notification (e.g., traffic including packets with a destination-host address of the server IHS 206a) will be forwarded by the network device over a new path to rebalance the network traffic.

Referring now to FIGS. 6, 7, 8, and 9, an example of the operation of the method 500 (in response to the congestion notification sent from the router IHS 204j according to the method 400) is illustrated. As discussed above, due to the first traffic situation 600 illustrated in FIG. 6, the router IHS 204j sends the congestion notification that is associated with traffic destined for the server IHS 206a, and that congestion notification is received at block 502 of the method 500 by the router IHSs 204f and 204h. The router IHS 204f is not handling traffic for the destination-network that includes the server IHS 206a, and thus may forward the congestion notification upstream (e.g., to router IHSs 204c and 204d). Meanwhile, the router 204h has no other available paths to the destination-network that includes the server IHS 206a other than link(hj), so the router IHS 204h forwards the congestion notification to each of the router IHSs 204c, 204d, and 204e.

Figure 7:
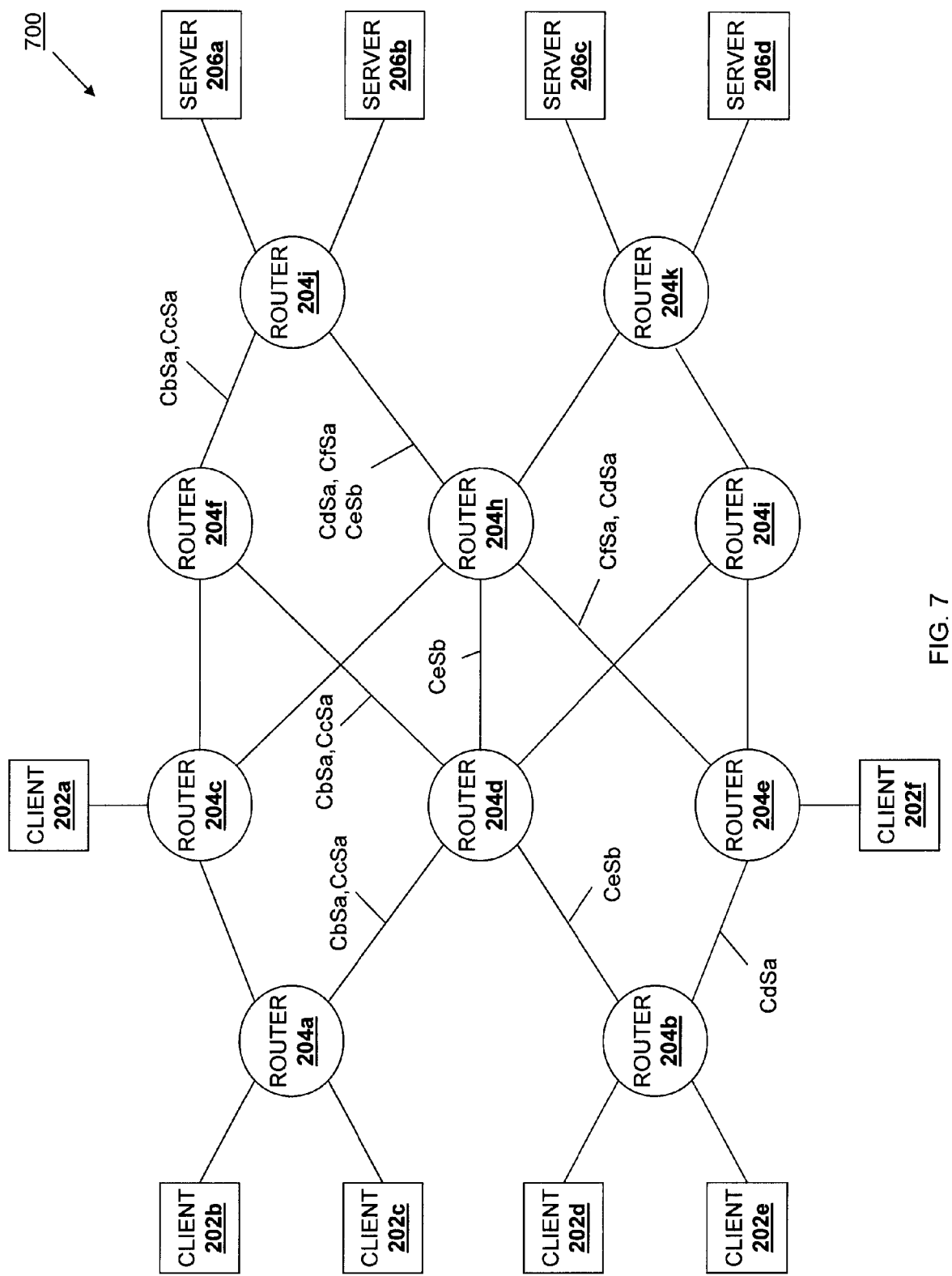
FIG. 7 is a schematic view illustrating an embodiment of the networked system of FIG. 2a in a second traffic situation after the methods of FIGS. 4 and 5.

Referring now to FIGS. 6 and 7, a second traffic situation 700 illustrates the operation of the method 500 to rebalance the network traffic from the first traffic situation 600 in response to the congestion notification send by the router IHS 204j (and forwarded by other routers in the networked system 200.) As can be seen, the router IHS 204e only has one path to the destination-network that includes the server IHS 206a via link(eh), and so the router IHS 204e continues to forward traffic to the destination-network that includes the server IHS 206a over the link(eh) to the router 204h (e.g., the traffic CfSa illustrated in the first traffic situation, as well as the traffic CdSa illustrated in the second traffic situation). However, the router IHS 204e may forward the congestion notification upstream over link(be) to the router IHS 204b.

The router IHS 204d has an alternate equal cost path in link(df) for traffic to the destination-network that includes the server IHS 206a, and in this embodiment has added a destination-host routing entry for that path for traffic destined for the server IHS 206a (e.g., because that alternate path will not increase congestion in the networked system 200). Similarly, the router IHS 204b has an alternate equal cost path in link (be) for traffic to the destination-network that includes the server IHS 206a, and thus in this embodiment has added a destination-host routing entry for that path for traffic destined for the server IHS 206a. This results in router IHS 204d sending traffic CbSa and CcSa over link(df) and router IHS 204b sending traffic CdSa over link(be) (while traffic CeSb is still sent from router 204b over link(bd) to router 204d and then over link(dh) to router 204h)). As a result, traffic to the server 206a through the router IHS 204j (i.e., CbSa, CcSa, CdSa, and CfSa), which was all sent over the link(hj) in the first traffic situation 600, has been rebalanced in the second traffic situation 700 such that some of that traffic to server IHS 206a (CbSa and CcSa) is sent over link(fj) from router IHS 204f to router IHS 204j, and some of that traffic to server IHS 206a (CdSa and CfSa) is sent over link(hj) from router IHS 204h to router IHS 204j. Thus, in the second traffic situation 700 illustrated in FIG. 7, the router IHS 204b and the router IHS 204d have switched to per-destination-host load balancing to provide a specific destination-host route for traffic destined for the server 206a, while the remaining router IHSs in the networked system 200 use per-destination-network load balancing to provide a generic destination-network route for traffic destined for the destination-network that includes server IHS 206a or server IHS 206b.

Figure 8:
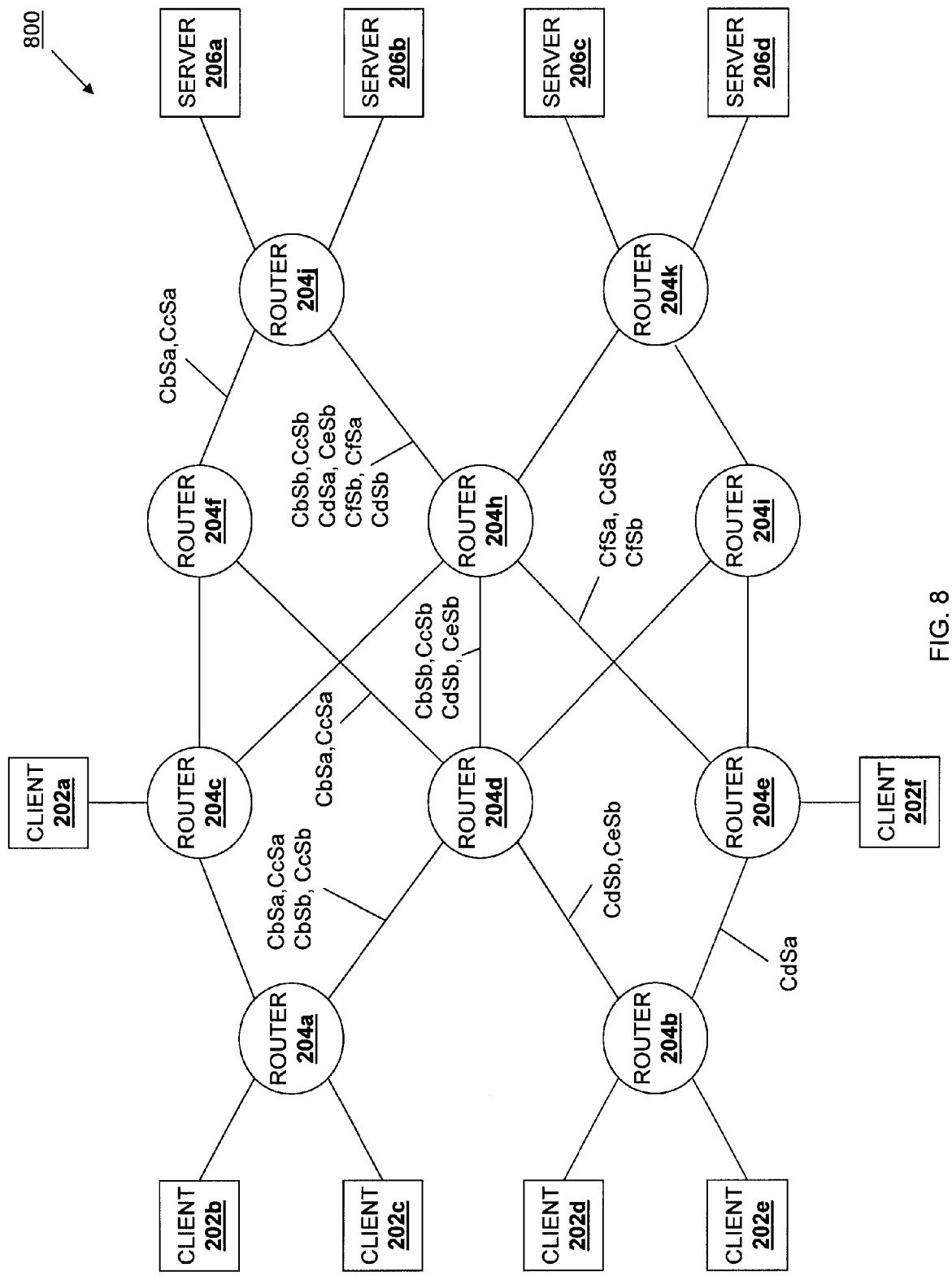
FIG. 8 is a schematic view illustrating an embodiment of the networked system of FIG. 2a in a third traffic situation after the methods of FIGS. 4 and 5.

Referring now to FIGS. 7 and 8, a third traffic situation 800 illustrates the addition of traffic to through the networked system 200 to the server IHS 206b (relative to the second traffic situation 600) that causes another congestion notification to be sent by the router IHS 204j. As discussed above, prior to the operation of the method 500 in response to a congestion notification for traffic destined for the server IHS 206b, each of the router IHSs 204a-k forwards traffic destined for the destination-network that includes the server IHS 206b using per-destination-network load balancing. As can be seen in the third traffic situation 800, the router 204a is now sending traffic CbSb and CcSb that was received from the client IHSs 202b and 202c, respectively, over the link(ad) to router IHS 204d. Furthermore, the router 204b continues to send traffic CeSb received from client IHS 202e (as well as new traffic CdSb received from client IHS 202d) over the link(bd) to the router IHS 204d. The router IHS 204d is forwarding that traffic CbSb, CcSb, CdSb, and CeSb over the link(dh) to the router IHS 204h. In addition, the router IHS 204e is also forwarding traffic CfSb over the link(eh) to the router 204h. As a result, the router 204h is forwarding traffic destined for the destination-network that includes the server IHS 206b (e.g., CbSb, ScSb, CdSb, CeSb, and CfSb) over the link(hj) to router IHS 204j, once again resulting in the router 204j detecting congestion and sending a congestion notification similarly as discussed above.

Figure 9:
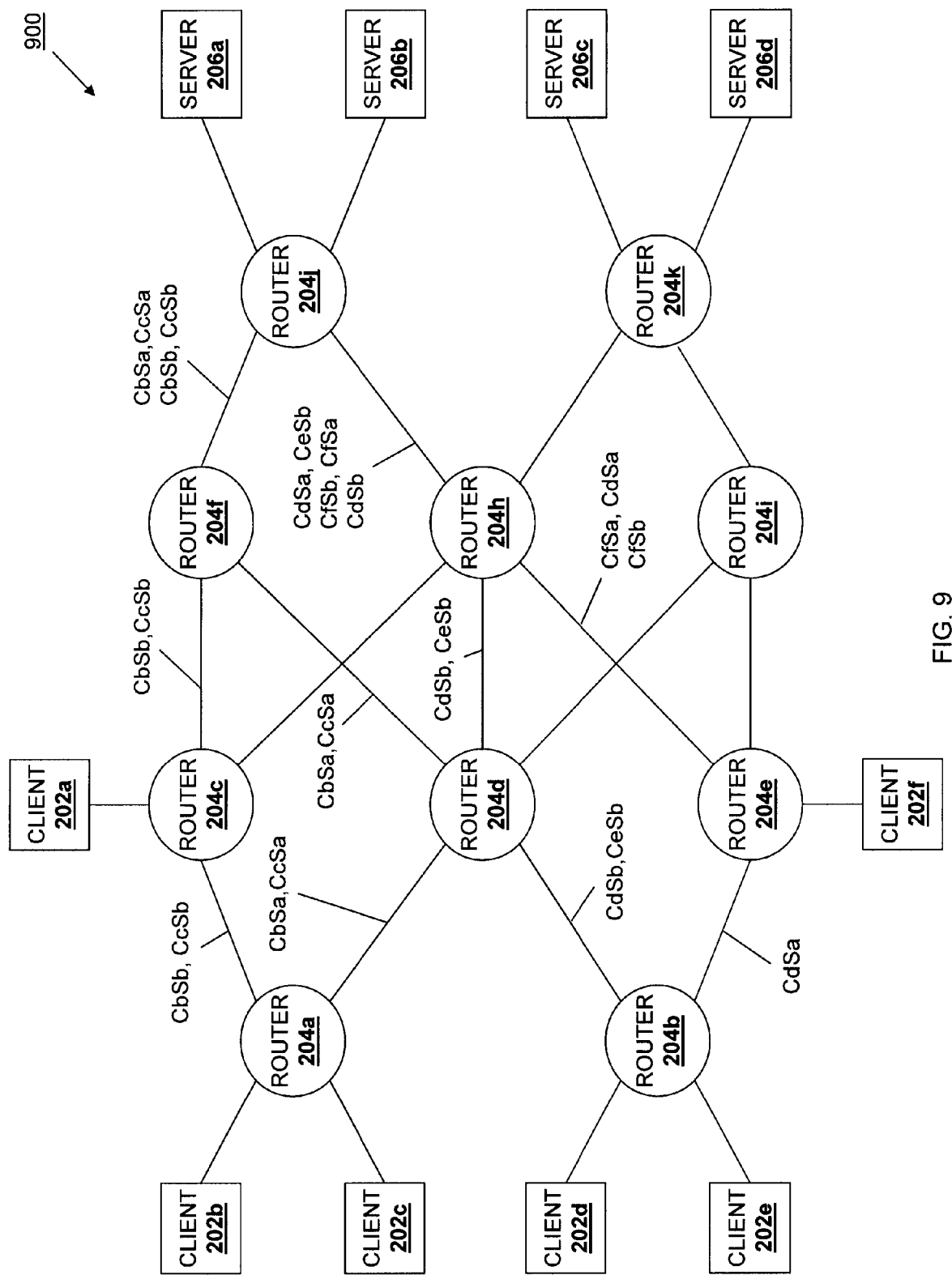
FIG. 9 is a schematic view illustrating an embodiment of the networked system of FIG. 2a in a fourth traffic situation after the methods of FIGS. 4 and 5.

Referring now to FIGS. 8 and 9, a fourth traffic situation 900 illustrates the operation of the method 500 to rebalance the network traffic from the third traffic situation 800 in response to the congestion notification send by the router IHS 204j (and forwarded by router IHSs 204f and 204h.) The router 204f makes no changes because it was not handling traffic destined for server IHS 206b in the third traffic situation 700. The router IHS 204h only has one path to the server IHS 206b, so the router IHS 204h forwards the congestion notification upstream to the router IHSs 204c, 204d, and 204e. The router 204c has not been receiving traffic destined for the server IHS 206b in the third traffic situation 800, and so may only forward the congestion notification upstream. In the illustrated embodiment, the router IHS 204d has determined that, while an alternate equal cost path exists (e.g. link(df)), the use of that path will overload link(fj), so that alternate path is not used and instead router IHS 204d forwards the congestion notification upstream to router IHSs 204a and 204b. Router IHS 204e only has one path to the server IHS 206b via link(eh), and so the router IHS 204e continues to forward traffic to the server IHS 206b to the router 204h over the link(eh) (e.g., the traffic CfSb illustrated in the third traffic situation, as well as the traffic CdSa illustrated in the second traffic situation 700 and the traffic CfSa illustrated in the first traffic situation 600). However, the router IHS 204e may forward the congestion notification upstream over link(be) to the router IHS 204b. In this embodiment, the router IHS 204b has decided not to use its alternate path (link(be)) for traffic destined for server IHS 206b because of the risk of congestion at link (be) or link (eh).

As can be seen from the third traffic situation 800 to the fourth traffic situation 900, the congestion notification from the router IHS 204j has been forwarded upstream through the networked system 200 (e.g., through the router IHS 204h and the router IHS 204d to the router IHS 204a) such that the router IHS 204a has determined that an alternate equal cost path through the link(ac) exists for the traffic CbSb and CcSb from the client IHSs 202b and 202c to the server IHS 206b that will not increase congestion in the networked system 200. In response, the router IHS 204a has added a routing entry to its routing table for traffic destined for the server IHS 206b, causing the traffic CbSb and CcSb to be sent from the router IHS 204a to the router 204c over link(ac) rather than to the router IHS 204d over link(ad). As can be seen, this results in the traffic CbSb and CcSb being forwarded over link(cf) between router IHSs 204c and 204f, and over link(fj) between router IHS 204f and 204j. Thus, in the fourth traffic situation 900 illustrated in FIG. 9, the router IHS 204a has switched to per-destination-host load balancing to provide a specific destination-host route for traffic destined for the server IHS 206b, while the remaining router IHSs in the networked system 200 use per-destination-network load balancing to provide a generic destination-network route for traffic destined for the network that includes server IHS 206a or server IHS 206b.

While it is possible that the router 204c may have chosen link(ch) for traffic destined for the server IHS 206b, such a decision would likely have resulted in link(hj) again becoming overloaded, and thus the router IHS 204j would have sent out another congestion notification that would have resulted in router 204c using a pre-destination-host routing entry to cause link(cf) to be used for traffic destined for the server 206b. Thus, one of skill in the art will appreciate that the congestion notifications and alternate path selections that cause some of the router IHSs to balance traffic on a per-destination-host basis rather than the default per-destination network basis, provide for dynamic network load rebalancing that reduces congestion and the occurrence of under-utilized links between the router IHSs in the networked system 200. Routing entries providing for the per-destination-host load balancing may be removed from the routing tables of any network device following a predetermined amount of time, following a determination that traffic associated with that destination host has not been received for a predetermined amount of time, following a determination that the routing table is filling up and that routing entry has been used the least, etc.

As discussed above, ECMP per-packet load balancing is too costly to implement in a majority of networked systems and can result in out-of-order packets, ECMP per-destination-host load balancing is a good alternative but can be impractical for core routers, and ECMP per-destination-network load balancing provides a decent compromise but may still result in under-utilized links. The systems and methods of the present disclosure provide for a balance of per-destination-network load balancing and per-destination-host load balancing where per-destination-host load balancing is only used when necessary, which provides for the re-balancing of the network traffic on a global network basis rather than conventional techniques that only balance locally (e.g., based on a conditions at a single network device.)

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network device, comprising:
a communication interface;
a processing system that is coupled to the communication interface;
a memory system that is coupled to the processing system and includes instructions that, when executed by the processing system, cause the processing system to:

receive first traffic through the communication interface;
forward the first traffic downstream through the communication interface using a first path, wherein the first path is determined by load balancing based on a destination network for the first traffic,
receive a congestion notification from a downstream network device through the communication interface; and
determine whether the congestion notification is associated with the first traffic and, in response to the first traffic being associated with the congestion notification, determine whether a second path exists for forwarding subsequent traffic that is associated with the congestion notification downstream through the communication interface, wherein the second path is determined by load balancing based on a destination host of the first traffic.

2. The network device of claim 1, wherein the load balancing based on the destination network for the first traffic includes Equal Cost Multi-Path (ECMP) per-destination network load balancing.

3. The network device of claim 1, wherein the load balancing based on the destination host for the first traffic includes Equal Cost Multi-Path (ECMP) per-destination host load balancing.

4. The network device of claim 1, wherein the memory system includes instructions that, when executed by the processing system, cause the processing system to:
determine that the second path does not exist for forwarding the subsequent traffic that is associated with the congestion notification downstream though the communication interface;
determine that bandwidth is available to receive and forward the subsequent traffic that is associated with the congestion notification downstream using the first path; and
forward the congestion notification to an upstream network device.

5. A network device, comprising:
a communication interface;
a processing system that is coupled to the communication interface;
a memory system that is coupled to the processing system and includes instructions that, when executed by the processing system, cause the processing system to:
receive first traffic through the communication interface;
forward the first traffic downstream through the communication interface using a first path, wherein the first path is determined by load balancing based on a destination network for the first traffic,
receive a congestion notification from a downstream network device through the communication interface; and
determine whether the congestion notification is associated with the first traffic and, in response to the first traffic being associated with the congestion notification, determine whether a second path exists for forwarding subsequent traffic that is associated with the congestion notification downstream through the communication interface,
determine whether the second path increases congestion in a network that includes the first path and the second path; and
forward the congestion notification to an upstream network device in response to determining that the second path increases congestion in the network.

6. The network device of claim 5, wherein the memory system also includes instructions that, when executed by the processing system, cause the processing system to:
add a routing entry in a routing table for the second path in response to determining that the second path does not increase congestion in the network; and
forward subsequent traffic that is associated with the congestion notification downstream through the communication interface using the second path.

7. The network device of claim 6, wherein the memory system also includes instructions that, when executed by the processing system, cause the processing system to:
remove the routing entry in the routing table for the second path; and
forward subsequent traffic that is associated with the congestion notification downstream through the communication interface using the first path.

8. A networked system, comprising:
a first network device in an network that is configured to:
detect congestion that is associated with first traffic received from an upstream network device; and
send a congestion notification upstream;
a second network device that coupled to the first network device in the network and upstream from the first network device, wherein the second network device is configured to:
receive the first traffic and forward the first traffic downstream to the first network device using a first path through the network, wherein the first path is determined by load balancing based on a destination network for the first traffic;
receive the congestion notification from the first network device; and
determine whether a second path in the network exists for forwarding subsequent traffic that is associated with the congestion notification downstream, wherein the second path is determined by load balancing based on a destination host for the first traffic.

9. The system of claim 8, wherein the load balancing based on the destination network for the first traffic includes Equal Cost Multi-Path (ECMP) per-destination network load balancing.

10. The system of claim 9, wherein the load balancing based on the destination host for the first traffic includes Equal Cost Multi-Path (ECMP) per-destination host load balancing.

11. The system of claim 8, wherein the second network device is configured to:
determine that the second path in the network does not exist for forwarding the subsequent traffic that is associated with the congestion notification downstream;
determine that bandwidth is available to receive and forward the subsequent traffic that is associated with the congestion notification downstream using the first path in the network; and
forward the congestion notification to an upstream network device.

12. A network system, comprising:
a first network device in an network that is configured to:
detect congestion that is associated with first traffic received from an upstream network device; and
send a congestion notification upstream;
a second network device that coupled to the first device in the network and upstream from the first network device, wherein the second network device is configured to:

receive the first traffic and forward the first traffic downstream to the first network device using a first path through the network;

receive the congestion notification from the first network device;

determine that a second path in the network exists for forwarding subsequent traffic that is associated with the congestion notification downstream;

determine whether the second path in the network does not increase congestion in the network; and forward the congestion notification to an upstream network device in response to determining that the second path in the network increases congestion in the network.

13. The system of claim 12, wherein the second network device is configured to:

add a routing entry in a routing table for the second path in the network in response to determining that the second path in the network does not increase congestion in the network; and forward the subsequent traffic that is associated with the congestion notification downstream using the second path in the network.

14. The system of claim 13, wherein the second network device is configured to:

remove the routing entry in the routing table for the second path in the network; and forward the subsequent traffic that is associated with the congestion notification downstream using the first path in the network.

15. A method for rebalancing a network load, comprising:

receiving first traffic from an upstream network device through a communication interface and forwarding that first traffic downstream through the communication interface using a first path in a network, wherein the first path is determined by load balancing based on a destination network for the first traffic;

receiving a congestion notification from a downstream network device through the communication interface; and determining whether the congestion notification is associated with the first traffic and, in response to the first traffic being associated with the congestion notification, determining whether a second path in the network exists for forwarding subsequent traffic that is associated with the congestion notification downstream through the communication interface, wherein the second path is determined by load balancing based on a destination host of the first traffic.

16. The method of claim 15, wherein load balancing based on the destination network for the first traffic includes Equal Cost Multi-Path (ECMP) per-destination network load balancing, and the load balancing based on the destination host for the first traffic includes Equal Cost Multi-Path (ECMP) per-destination host load balancing.

17. The method of claim 16, further comprising:

adding a routing entry in a routing table for the second path in the network in response to determining that the second path in the network does not increase congestion in the network; and forwarding the subsequent traffic that is associated with the congestion notification downstream through the communication interface using the second path in the network.

18. The method of claim 17, further comprising:

removing the routing entry in the routing table for the second path in the network; and forwarding the subsequent traffic that is associated with the congestion notification downstream through the communication interface using the first path in the network.

19. The method of claim 15, further comprising:

determining that the second path in the network does not exist for forwarding the subsequent traffic that is associated with the congestion notification downstream though the communication interface;

determining that bandwidth is available to receive and forward the subsequent traffic that is associated with the congestion notification downstream using the first path in the network; and forward the congestion notification to an upstream network device.

20. A method for rebalancing a network load, comprising:

receiving first traffic from an upstream network device through a communication interface and forwarding that first traffic downstream through the communication interface using a first path in a network, receiving a congestion notification from a downstream network device through the communication interface;

determining whether the congestion notification is associated with the first traffic and, in response to the first traffic being associated with the congestion notification, determining that a second path in the network exists for forwarding subsequent traffic that is associated with the congestion notification downstream determining whether the second path in the network does not increase congestion in the network; and forward the congestion notification to an upstream network device in response to determining that the second path in the network increases congestion in the network.

* * * * *

UNITED STATES PATENT AND TRADEMARK OFFICE
CERTIFICATE OF CORRECTION

PATENT NO. : 9,065,721 B2  
APPLICATION NO. : 13/831615  
DATED : June 23, 2015  
INVENTOR(S) : Cuong Nguyen Page 1 of 1

It is certified that error appears in the above-identified patent and that said Letters Patent is hereby corrected as shown below:

In the Claims

In column 13, lines 49-51

Please delete the following:

"wherein the first path is determined by load balancing based on a destination network for the first traffic,"

Signed and Sealed this
Twenty-sixth Day of April, 2016

Michelle K. Lee
*Director of the United States Patent and Trademark Office*